United States Patent
Chun et al.

(10) Patent No.: US 8,619,760 B2
(45) Date of Patent: Dec. 31, 2013

(54) METHOD OF PROVIDING CIRCUIT SWITCHED (SC) SERVICE USING HIGH-SPEED DOWNLINK PACKET ACCESS (HSDPA) OR HIGH-SPEED UPLINK PACKET ACCESS (HSUPA)

(75) Inventors: Sung-Duck Chun, Gyeonggi-Do (KR);
Seung-June Yi, Gyeonggi-Do (KR);
Sung-Jun Park, Gyeonggi-Do (KR);
Young-Dae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 348 days.

(21) Appl. No.: 12/738,278

(22) PCT Filed: Oct. 16, 2008

(86) PCT No.: PCT/KR2008/006114
§ 371 (c)(1),
(2), (4) Date: Apr. 15, 2010

(87) PCT Pub. No.: WO2009/051420
PCT Pub. Date: Apr. 23, 2009

(65) Prior Publication Data
US 2010/0208686 A1     Aug. 19, 2010

Related U.S. Application Data

(60) Provisional application No. 60/980,765, filed on Oct. 17, 2007, provisional application No. 60/981,809, filed on Oct. 22, 2007, provisional application No. 60/983,866, filed on Oct. 30, 2007.

(30) Foreign Application Priority Data

Oct. 15, 2008  (KR) .................. 10-2008-0101330

(51) Int. Cl.
*H04L 12/66* (2006.01)
*H04L 12/28* (2006.01)

(52) U.S. Cl.
USPC ............ 370/356; 370/353; 370/412; 455/410

(58) Field of Classification Search
USPC ......... 370/351, 352, 353, 354, 356, 466, 469, 370/473; 380/35, 36; 455/410, 450
See application file for complete search history.

(56) References Cited

U.S. PATENT DOCUMENTS 6,388,997 B1   5/2002   Scott
6,421,334 B1   7/2002   Baines
(Continued)

FOREIGN PATENT DOCUMENTS

JP   2000-151694 A   5/2000
JP   2002-268697 A   9/2002
(Continued)

OTHER PUBLICATIONS

3GPP "CS over HSDPA" TSG-RAN WG2 Meeting #59bis, Shanghai, China, Oct. 8-12, 2007.*

(Continued)

*Primary Examiner* — Awet Haile
(74) *Attorney, Agent, or Firm* — McKenna Long & Aldridge LLP

(57) ABSTRACT

Disclosed is a radio (wireless) communication system providing a radio communication service and a terminal, and an operation method of a Packet Data Convergence Protocol (PDCP) entity in a Universal Mobile Telecommunications System (UMTS), and more particularly, to an operation method of transmitting, by a transmitting side (transmitter), data blocks by including a Connection Frame Number (CFN) therein such that a receiving side (receiver) processes each of received data blocks by a reference time, as a method of providing a Circuit Switched (CS) service using a High Speed Downlink Packet Access (HSDPA) or High Speed Uplink Packet Access (HSUPA) technology.

4 Claims, 3 Drawing Sheets

(56) References Cited

U.S. PATENT DOCUMENTS

| | | | |
|---|---|---|---|
| 6,434,389 | B1 | 8/2002 | Meskanen et al. |
| 6,870,824 | B1 | 3/2005 | Kim et al. |
| 7,209,747 | B2 | 4/2007 | Chen |
| 7,310,336 | B2 | 12/2007 | Malkamaki |
| 7,921,348 | B2 | 4/2011 | Seidel et al. |
| 8,131,295 | B2 | 3/2012 | Wang et al. |
| 8,320,327 | B2 | 11/2012 | Pani et al. |
| 2001/0021661 | A1* | 9/2001 | Pautonnier ............... 455/561 |
| 2001/0024956 | A1 | 9/2001 | You et al. |
| 2002/0126629 | A1 | 9/2002 | Jiang et al. |
| 2003/0224790 | A1 | 12/2003 | Choi |
| 2004/0162074 | A1 | 8/2004 | Chen |
| 2004/0208142 | A1 | 10/2004 | Saw |
| 2005/0041681 | A1 | 2/2005 | Lee et al. |
| 2005/0190712 | A1 | 9/2005 | Lee et al. |
| 2005/0220042 | A1 | 10/2005 | Chang et al. |
| 2005/0249163 | A1 | 11/2005 | Kim et al. |
| 2005/0287957 | A1* | 12/2005 | Lee et al. ............... 455/68 |
| 2006/0035662 | A1 | 2/2006 | Jeong et al. |
| 2006/0104225 | A1 | 5/2006 | Kim et al. |
| 2006/0116136 | A1 | 6/2006 | Noma |
| 2006/0251023 | A1 | 11/2006 | Choi |
| 2007/0047547 | A1* | 3/2007 | Conner et al. ............ 370/392 |
| 2007/0049325 | A1 | 3/2007 | Lee |
| 2007/0115894 | A1 | 5/2007 | Herrmann et al. |
| 2007/0183372 | A1 | 8/2007 | Janko et al. |
| 2007/0201424 | A1* | 8/2007 | Kobayashi et al. ....... 370/349 |
| 2007/0202892 | A1 | 8/2007 | Voyer |
| 2007/0250751 | A1 | 10/2007 | Cai et al. |
| 2007/0253393 | A1 | 11/2007 | Tseng |
| 2007/0291688 | A1 | 12/2007 | Jiang et al. |
| 2008/0043771 | A1 | 2/2008 | Cho et al. |
| 2008/0081645 | A1 | 4/2008 | Kim et al. |
| 2008/0119209 | A1 | 5/2008 | Upp |
| 2008/0188247 | A1 | 8/2008 | Worrall |
| 2008/0205433 | A1 | 8/2008 | Pihlaja et al. |
| 2008/0220784 | A1 | 9/2008 | Somasundaram et al. |
| 2008/0226074 | A1* | 9/2008 | Sammour et al. ............ 380/270 |
| 2008/0233941 | A1 | 9/2008 | Jen |
| 2008/0268843 | A1 | 10/2008 | Ore et al. |
| 2008/0318578 | A1 | 12/2008 | Worrall |
| 2009/0034452 | A1 | 2/2009 | Somasundaram et al. |
| 2009/0041240 | A1 | 2/2009 | Parkvall et al. |
| 2009/0086853 | A1 | 4/2009 | Ye |
| 2009/0088160 | A1 | 4/2009 | Pani et al. |
| 2009/0111445 | A1 | 4/2009 | Ratasuk et al. |
| 2009/0247211 | A1 | 10/2009 | Kuroda |
| 2009/0318175 | A1 | 12/2009 | Sandberg |
| 2010/0077272 | A1 | 3/2010 | Peisa et al. |
| 2010/0091721 | A1 | 4/2010 | Larmo et al. |
| 2010/0093386 | A1 | 4/2010 | Damnjanovic et al. |
| 2010/0178923 | A1* | 7/2010 | Yi et al. ............... 455/436 |
| 2010/0232301 | A1 | 9/2010 | Omori |
| 2010/0284376 | A1 | 11/2010 | Park et al. |
| 2010/0290427 | A1 | 11/2010 | Sebire et al. |
| 2011/0268234 | A1 | 11/2011 | Khandekar et al. |

FOREIGN PATENT DOCUMENTS

| | | |
|---|---|---|
| JP | 2003-87317 A | 3/2003 |
| JP | 2004-349882 A | 12/2004 |
| JP | 2005-530463 A | 10/2005 |
| JP | 2006-506892 A | 2/2006 |
| KR | 10-2004-0008100 | 1/2004 |
| KR | 10-2004-0008228 | 1/2004 |
| KR | 10-2005-0014984 | 2/2005 |
| KR | 10-2005-0028254 | 3/2005 |
| KR | 10-2006-0024756 | 3/2006 |
| KR | 10-2007-0080188 | 8/2007 |
| KR | 10-2007-0120453 | 12/2007 |
| WO | WO 03/027860 A1 | 4/2003 |
| WO | WO 2004/004163 A1 | 1/2004 |
| WO | WO 2005/091668 A1 | 9/2005 |
| WO | WO 2005/122441 A1 | 12/2005 |
| WO | WO 2006/035501 A1 | 4/2006 |
| WO | WO 2006/096036 | 9/2006 |
| WO | WO 2006/096036 A1 | 9/2006 |
| WO | WO 2006/118426 A1 | 11/2006 |
| WO | WO 2006/118738 A1 | 11/2006 |

OTHER PUBLICATIONS

Nokia seimens networks "CS over HSPA impact to specification" 3GPP TSG-RAN-WG2 Meeting #59bis, Shanghai, China, Oct. 8-12, 2007.*

Nokia "CS over HSPA impact to specification" 3GPP TSG-RAN-WG2 Meeting #59bis, R2-074017 Shanghai, China, Oct. 8-12, 2007.*

3$^{rd}$ Generation Partnership Project, "Technical Specification Group Radio Access Network; Synchronization in UTRAN Stage 2 (Release 7)", 3GPP TS 25.402, 77.5.0, Dec. 2007.

Nokia Siemens Networks, "Change Request", 3GPP TSG-RAN2, Meeting #59bis, Shanghai, China, Oct. 8-12, 2007, R2-074504.

Nokia Siemens Networks, "CS over HSPA impact to specification", 3GPP TSG-RAN WG2 Meeting #59bis, Shanghai, China, Oct. 8-12, 2007, R2-074017.

Nokia Siemens Networks, "Change Request: CS over HSPA", 3GPP TSG-RAN WG2 Meeting #59bis, Shanghai, China, Oct. 8-12, 2007, R2-07XXXX.

"Change Request (no title)", 3GPP TSG-RAN WG2 Meeting #59bis, Athens, Greece, Aug. 20-24, 2007, R2-07XXXX.

* cited by examiner

CS

PS

Fig. 6
| Index | Number of bit for Subflow A | Number of bit for Subflow B | Number of bit for Subflow C |
|---|---|---|---|
| 1 | 50 | 30 | 0 |
| 2 | 70 | 20 | 20 |
| 3 | 80 | 30 | 10 |
Fig. 7
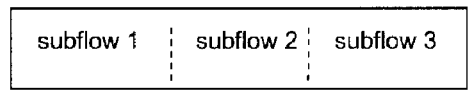
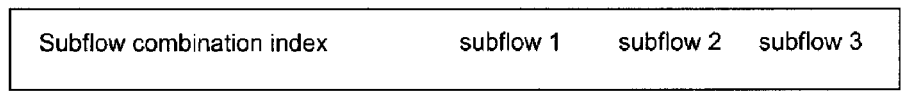
Fig. 8
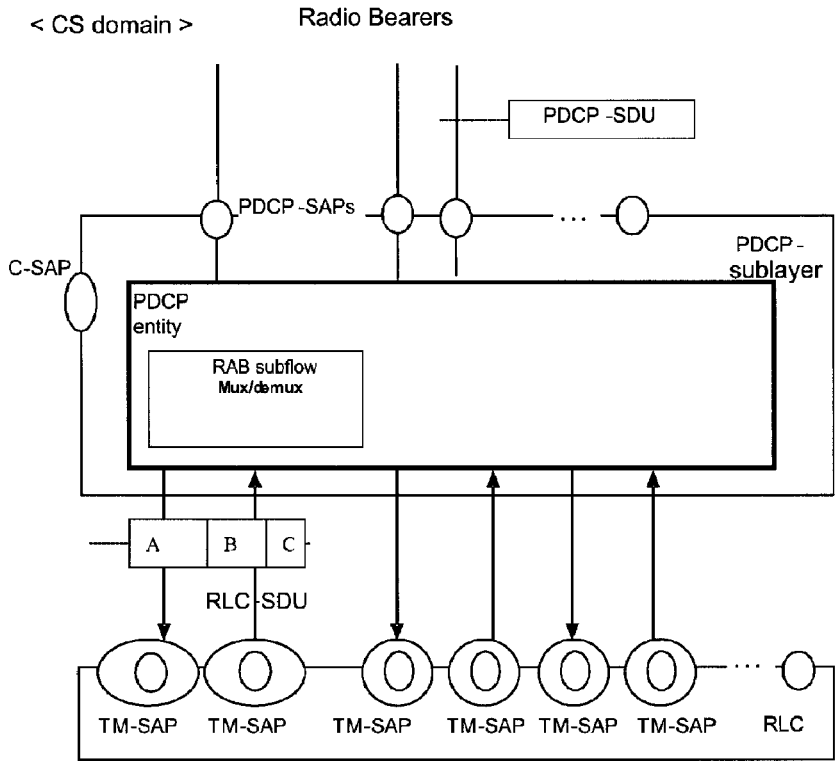

METHOD OF PROVIDING CIRCUIT SWITCHED (SC) SERVICE USING HIGH-SPEED DOWNLINK PACKET ACCESS (HSDPA) OR HIGH-SPEED UPLINK PACKET ACCESS (HSUPA)

This application is a 35 U.S.C. §371 National Stage entry of International Application No. PCT/KR2008/006114, filed on Oct. 16, 2008, and claims priority to U.S. Provisional Application Nos. 60/980,765, filed Oct. 17, 2007, 60/981, 809, filed Oct. 22, 2007, 60/983,866 filed Oct. 30, 2007, and Korean Application No. 10-2008-0101330, filed on Oct. 15, 2008, each of which is hereby incorporated by reference in its entirety as if fully set forth herein.

TECHNICAL FIELD

The present invention relates to a radio (wireless) communication system providing a radio communication service and a terminal, and an operation method of a Packet Data Convergence Protocol (PDCP) entity in a Universal Mobile Telecommunications System (UMTS), and more particularly, to an operation method of transmitting, by a transmitting side (transmitter), data block(s) by including a Connection Frame Number (CFN) therein such that a receiving side (receiver) processes each of received data block(s) by a reference time, as a method of providing a Circuit Switched (CS) service using a High Speed Downlink Packet Access (HSDPA) or High Speed Uplink Packet Access (HSUPA) technology.

BACKGROUND ART

FIG. 1 shows an exemplary network structure of a Universal Mobile Telecommunications System (UMTS). The UMTS system is generally comprised of a terminal (i.e., User Equipment (UE)), an UMTS radio connection network (UMTS Terrestrial Radio Access Network (UTRAN) and a Core Network (CN). The UTRAN includes one or more Radio Network Sub-systems (RNS), and each RNS is comprised of a Radio Network Controller (RNC) and one or more base stations (Node Bs) managed by the RNC. One eNode B may have one or more cells.

FIG. 2 shows an exemplary architecture of radio protocols used in the UMTS. The radio protocol layers exist as pairs between a terminal and the UTRAN and handle a data transmission over radio interface. Descriptions of each of the radio protocol layers will be given. First, the physical layer (Layer 1) serves to transmit data over the radio interface by using a variety of radio transmission technologies. The physical layer is connected to an upper layer called a medium access control (MAC) layer via a transport channel. The transport channel is divided into a dedicated transport channel and a common transport channel according to whether a channel is shared.

The second layer includes various layers, such as the MAC, RLC, PDCP and BMC layers. First, the medium access control (MAC) layer performs mapping various logical channels onto various transport channels, and performs logical channel multiplexing by mapping several logical channels onto a single transport channel. The MAC layer is connected with an upper layer called a radio link control (RLC) layer via a logical channel. The logical channel is divided into a control channel that transmits information of the control plane and a traffic channel that transmits information of the user plane according to a type of transmitted information. The MAC layer can be divided into a MAC-b sub-layer, a MAC-d sub-layer, a MAC-c/sh sub-layer, a MAC-hs sub-layer and a MAC-e sub-layer according to the type of transport channel being managed. The MAC-b sub-layer manages a Broadcast Channel (BCH), which is a transport channel handling the broadcasting of system information. The MAC-c/sh sub-layer manages a common transport channel, such as Forward Access Channel (FACH) or Downlink Shared Channel (DSCH), which is shared by a plurality of terminals. The MAC-d sub-layer manages a Dedicated Channel (DCH), which is a dedicated transport channel for a specific terminal. In addition, in order to support uplink/downlink high-speed data transmission, the MAC-hs sub-layer manages the High Speed-Downlink Shared Channel (HS-DSCH), which is a transport channel for high-speed downlink data transmission. The MAC-e sub-layer manages the Enhanced Dedicated Channel (E-DCH), which is a transport channel for high-speed uplink data transmission.

The Radio Resource Control (RLC) layer serves to guarantee various QoSs (Quality of services) required by each radio bearer (RB) and data transmission. Each RB has one or two independent RLC entities so as to guarantee RB-unique QoS, and the RLC layer provides three operational males: a TM (Transparent Male); a UM (Unacknowledged Male); and an AM (Acknowledged Mode) so as to support various QoSs. In addition, the RLC layer segments and/or concatenates data received from an upper layer to adjust the data size so as for a lower layer to suitably transmit the data to a radio interface.

The PDCP layer is located above the RLC layer. The PDCP layer performs a header compression function that reduces unnecessary control information such that data being transmitted by employing Internet Protocol (IP) packets, such as IPv4 or IPv6, can be efficiently sent over a radio interface that has a relatively small bandwidth. Thusly, the header compression increases transmission efficiency between radio interfaces by allowing the header part of the data to transmit only the essential information. Since the header compression function is basically provided in the PDCP layer, the PCDP layer exists only in a PS domain. A single PDCP entity would exist in each RB so as to provide the efficient header compression function to each of PS services.

The Broadcast/Multicast Control (BMC) layer of Layer 2 (L2) is located above the RLC layer. The BMC layer schedules a Cell Broadcast (CB) message, and broadcasts the CB message to terminals positioned in a specific cell or cells.

The Radio Resource Control (RRC) layer located at the lowermost portion of Layer 3 is only defined in the control plane. The RRC layer handles the control of parameters of the Layers 1 and 2 with respect to the setup (configuration), re-configuration and release of radio bearers (RB), and performs the control of logical channels, transport channels, and physical channels. Here, the RB refers to a logical path that is provided by the Layer 1 and Layer 2 of a radio protocol for data transfer between the mobile terminal and the UTRAN. In general, the setup of the RB refers to the process of stipulating the characteristics of a radio protocol layer and a channel required for providing a specific data service, and setting the respective detailed parameters and operation methods.

A Wideband Code Division Multiple Access (WCDMA) system has employed the High Speed Downlink Packet Access (HSDPA) and the High Speed Uplink Packet Access (HSUPA) technologies. In particular, these two technologies have been employed to effectively support the Packet Switched (PS) service. The HSDPA and the HSUPA may also be referred to as the HSPA.

The Circuit Switched (CS) scheme is a scheme for exchanging data by establishing a communication circuit between a transmitting side and a receiving side. In the CS scheme, a dedicated communication path is provided in advance between two stations desiring to communicate with each other, and the dedicated communication path is comprised of links for consecutively connecting each node. Each of the physical links is connected by a single channel, and thusly this would be appropriately and easily used in data exchange, which requires a relatively seamless flow, such as a telephone, a sensor, a telemetry input and the like. During data transmission, the CS scheme transmits data via the established communication circuit. Accordingly, it would be appropriate when transmitting a great amount of data or long messages, e.g., file transmission. A time division circuit switching employs a digital switching technology and multiplexing of a pulse code modulation in a digital communication circuit, thereby being greatly efficient for high-speed data transmission of a high quality. In this scheme, a dedicated (fixed) physical circuit between each of two end points is allocated, thereby minimizing a transfer delay from a time point at which data had been generated to a time point at which data transmission is started. In addition, since the dedicated (fixed) circuit is used, there is no transmission order reversal phenomenon in each data.

The Packet Switched (PS) scheme is a scheme that stores a data transmission unit having a certain length as a packet format in a transmitting-side packet switch. The PS scheme selects an appropriate communication path according to an address of a receiving side, and then transmits the same to a receiving-side packet switch. In the PS scheme, data is transmitted in data block units with a short length called a packet. In general, a length of the packet is limited to be approximately 1000 bytes. Each packet is comprised of a portion indicating user data and a portion indicating control information of a packet. Here, the control information of the packet should at least include information required to set a path of the packet within a network such that the packet is delivered to the receiving side. Once the packets are received by each node via the transmission path, the packets are first stored and then transmitted to the next node. Such storage process until the packet is delivered to the receiving side and the transmission process to the next node are repeated. In this scheme, a specific terminal does not continuously occupy a specific path, rather it occupies and uses the specific path only when needed, thereby maximizing efficiency of circuit usage. In addition, each data unit may be transmitted through different paths, thusly an amount of the transfer delay undergone by each data would differ.

Recently, mobile communication services have been developed to maximize efficiency in supporting a packet service, such as an Internet browsing and the like. Among those, a voice communication service is considered as the most important service in the mobile communications and is mainly provided through the circuit switched service.

Currently, the UMTS system has additionally employed R5 HSDPA and R6 HSUPA to support PS services, based on the R99 version WCDMA optimized for the CS service. That is, the current system supports both the CS network for the CS service and the PS network for the PS service. However, from the perspective of network operation, problems of a cost for installing the CS network and the PS network as well as of independently managing the two networks would occur.

To solve such problems, it would be expected to operate the PS network only, with gradual reduction in the support for the CS network. For this, there is a need to have a method for replacing all CS services with the PS services, or a method for effectively providing the CS services in the PS network.

In particular, there is a need to have a method for supporting the CS voice service representing the CS services in the PS network, i.e., in the HSPA network that employs the HSDPA and the HSUPA technologies.

DISCLOSURE OF INVENTION

Technical Solution

Therefore, an object of the present invention is to provide a method for effectively transmitting data, which is generated in a CS service, in the PS network or in a radio protocol supporting PS service only.

To achieve this and other advantages and in accordance with the purpose of the present invention, as embodied and broadly described herein, there is provided a method for providing data in a wireless communication system, the method comprising: receiving at least one of service data units (SDUs) from an upper layer; adding a header to the at least one of received service data units (SDU) to generate a protocol data unit (PDU), wherein the header includes timing information; and delivering the generated protocol data unit to a lower layer.

Preferably, the timing information is a Connection Frame Number (CFN).

Preferably, the timing information is added to a header in a packet data convergence protocol (PDCP) layer.

Preferably, the timing information is added to a header in a medium access control (MAC) layer.

Preferably, the timing information is a circuit switched (CS) counter.

Preferably, the timing information is related to a connection frame number (CFN).

Preferably, the data is provided in packet service (PS) or circuit service (CS).

Preferably, the upper layer is a Radio Link Control (RLC) entity and the lower layer is a physical entity.

BRIEF DESCRIPTION OF THE DRAWINGS

FIG. 6 is an exemplary view showing an indicator, 'a subflow combination index,' included in a Protocol Data Unit (PDU) according to the present invention;

FIG. 7 is an exemplary view showing a PDU format in case of multiplexing of subflows according to the present invention; and FIG. 8 is an exemplary view showing a structure of Packet Data Convergence Protocol (PDCP) related to subflow multiplexing according to the present invention.

MODE FOR THE INVENTION

Figure 1:
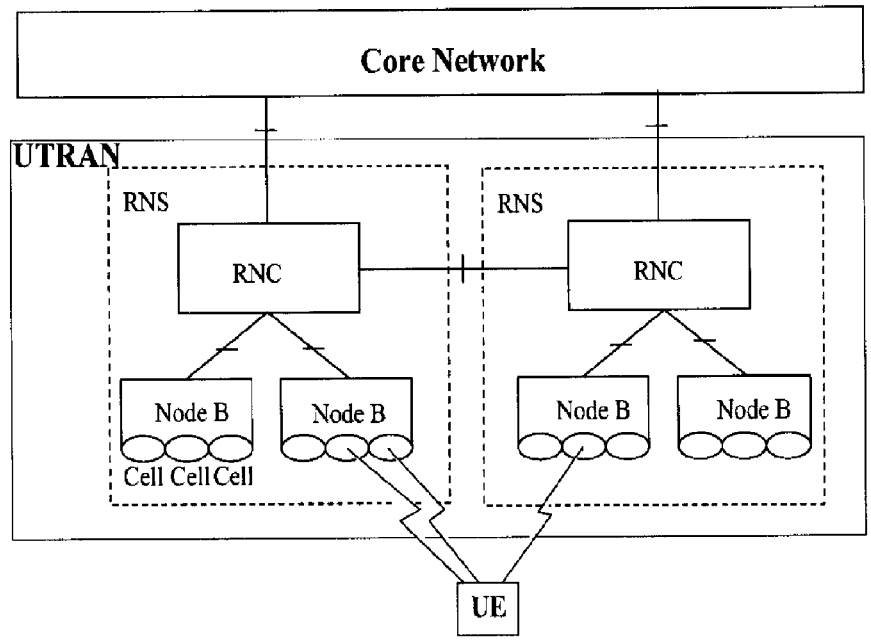
FIG. 1 shows an exemplary network structure of an Evolved Universal Terrestrial Radio Access Network (E-UTRAN) as a mobile communication system to which a related art and the present invention are applied.
Figure 2:
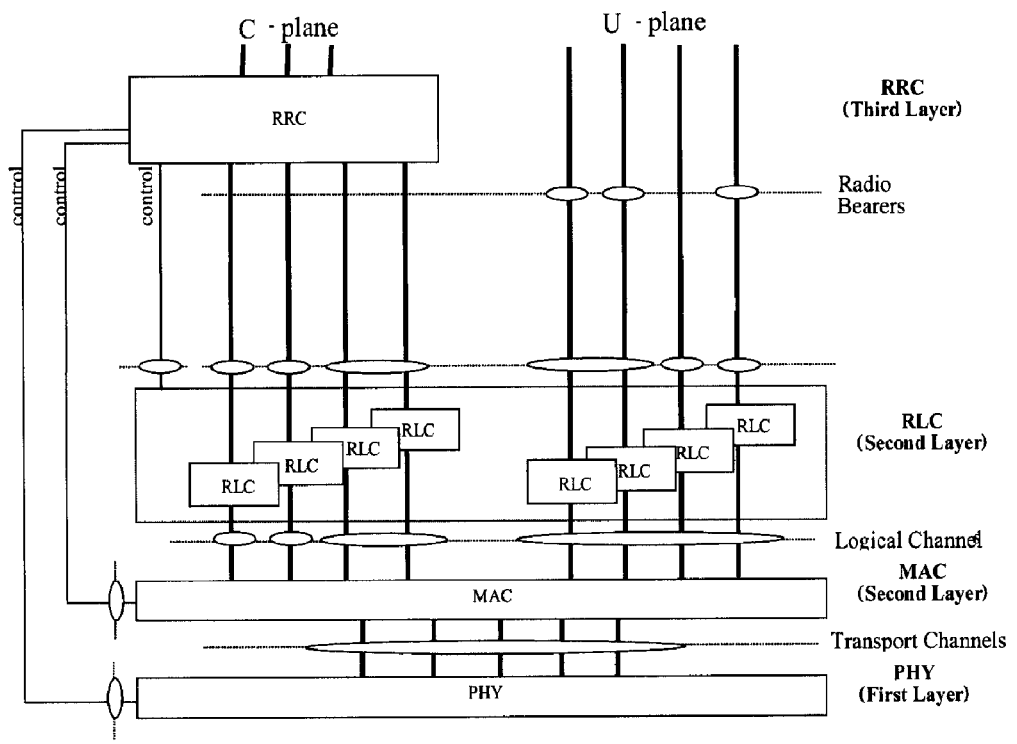
FIG. 2 is an overview of an exemplary architecture of radio protocols used in the UMTS.
Figure 3:
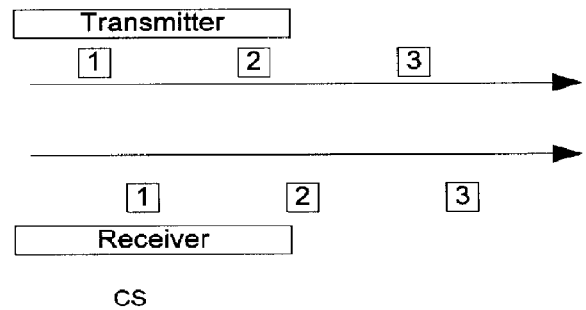
FIG. 3 is an exemplary view showing a Circuit Switched (CS) scheme and a Packet Switched (PS) scheme for data exchange between a transmitter and a receiver.
Figure 3:
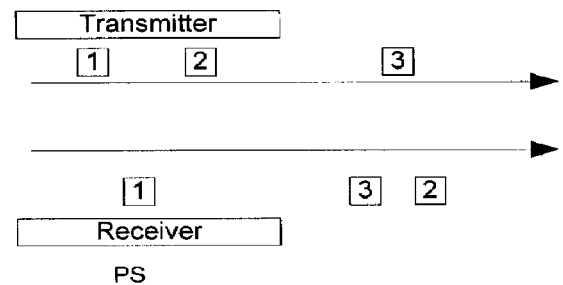

One aspect of the present invention is the recognition by the present inventors regarding the problems and drawbacks of the related art described above and explained in more detail hereafter. Based upon such recognition, the features of the present invention have been developed.

The present invention is applied to the 3GPP communication technology, in particular, to the UMTS system, a communication apparatus and a communication method. However, the present invention is not limited to the UMTS system, and may also be applied to all wired/wireless communication systems to which the technical scope of the present invention can be applied.

The present invention conceptually relates to a method for providing data in a wireless communication system, the method comprising: receiving at least one of service data units (SDUs) from an upper layer; adding a header to the at least one of received service data units (SDU) to generate a protocol data unit (PDU), wherein the header includes timing information; and delivering the generated protocol data unit to a lower layer, and a wireless mobile communication terminal or network capable of implementing such method.

As described above, the present invention is to provide a method for effectively transmitting data, which is generated in a CS service, in a PS network or in a radio protocol supporting a PS service only. In particular, the present invention proposes to transmit CS service data by including timing information thereto, in order to maintain a sequence (order) of data generated in the CS service and to solve problems caused by different transfer time delays occurring during the transmission of the CS service data.

More specifically, if a certain protocol entity receives a Service Data Unit (SDU) from a CS service application, the protocol entity processes the SDU, and then delivers a Protocol Data Unit (PDU), which is the processed SDU, to a lower protocol entity. Here, it is proposed to include, in the PDU, timing information about the SDU or PDU. Here, the protocol entity may be a Packet Data Convergence Protocol (PDCP) entity, a Radio Resource Control (RRC) entity, a Radio Link Control (RLC) entity or a Medium Access Control (MAC) entity. In addition, the timing information may be a Connection Frame Number (CFN), a portion of the CFN, or information associated with the CFN. The timing information may indicate a time at which the SDU is generated or CFN or may notify related information thereof. The timing information may indicate a time at which the PDU is generated or CFN or may notify related information thereof. In addition, the timing information may indicate a time at which a transmitting side has received the SDU from higher layers or CFN, or notify related information thereof. The timing information may indicate a time at which a receiving side should process the SDU or PDU or CFN, or notify related information thereof. Further, the timing information may indicate a time at which the transmitting side has processed the SDU or PDU or CFN or may notify related information thereof, or may indicate a time at which the receiving side delivers the SDU or PDU to the higher layers or CFN, or may notify related information thereof. In addition, the timing information may indicate a time at which the transmitting side has ciphered the SDU or PDU or CFN or a serial number applied during the ciphering or may notify related information thereof. The timing information may indicate a time at which the receiving side should perform de-ciphering on the SDU or PDU or CFN or a serial number needing to be applied during the de-ciphering, or may notify related information thereof. Further, the timing information may be a CS counter, and a value of the CS counter may be set to the first to the fifth LSBs of the CFN at which the packet has been received from higher layers.

Hereinafter, description of structures and operations of the preferred embodiments according to the present invention will be given with reference to the accompanying drawings.

First, description of the Connection Frame Number (CFN) related to the present invention will be given. The CFN is timing information managed by a base station and a terminal in an RRC connected state. The CFN is uniquely set in each terminal, and may be a reference of a data generating time or data processing time. The CFN may be a serial number value used when ciphering or deciphering a MAC SDU in the MAC entity. In addition, the CFN increases as the time increases. For instance, if it is assumed that CFN is 0 at 0.000 second, the CFN becomes 1 at 0.020 seconds and 2 at 0.040 seconds. The CFN increases in each time a certain period of time has elapsed, regardless of whether or not data has been transmitted at a certain time point. In this case, the CFN is a value increasing when the certain period of time has elapsed, regardless of whether or not data has been actually transmitted or received. A CFN field indicates the CFN at which the TM RLC PDU has been handled by the MAC and is used for ciphering in the transmitting entity and for the de-jittering queue and deciphering in the receiving entity.

Such CFN information signifies timing information, such as a time point at which certain data has been generated, at which certain data has reached to a certain entity from an upper entity, at which certain data has been transmitted to a lower entity, at which certain data has been delivered to an upper entity, or at which certain data has been processed or the like. The CFN may also be time point information used to define an operation in which the transmitting entity and the receiving entity should perform at a certain time.

Figure 4:
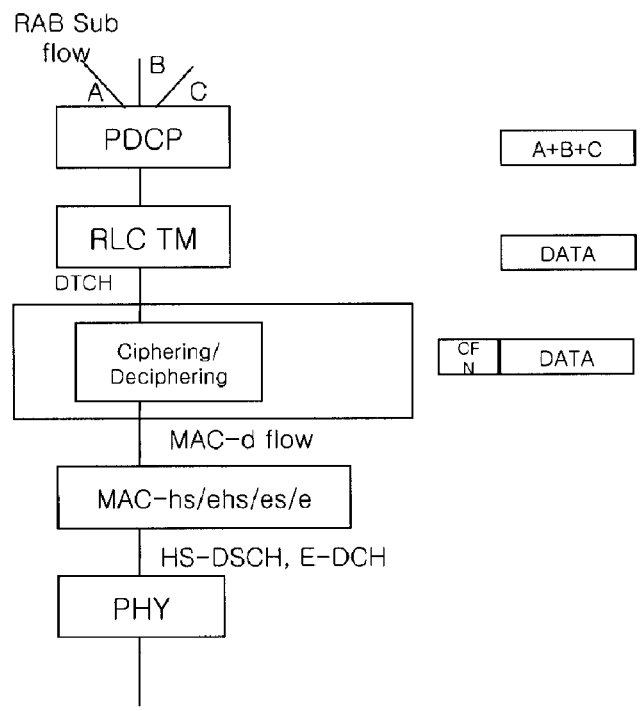
FIG. 4 is an exemplary view showing a method for applying CS service to a High Speed Packet Access (HSPA)-based technology.

FIG. 4 is an exemplary view showing a method for applying CS service to a High Speed Packet Access (HSPA)-based technology. As shown in FIG. 4, the MAC entity uses CFN-related information according to the present invention. That is, as compared to the related art, the present invention uses a RLC TM mode for the CS scheme in the HSPA technology and includes CFN-related information in MAC header of a MAC data block.

In general, when the terminal (or UE) moves from non-HSPA cell into HSPA cell, if CS user plane data is mapped to RLC UM, Radio Bearer reconfiguration from RLC TM to RLC UM may be necessary. Here, the RB reconfiguration may be done by using RB release and RB setup message. The RNC may need to wait until it receives the Radio Bearer Setup Complete message to acquire the START value for ciphering. In the present invention, it is proposed to map CS user plane data to RLC TM, instead of RLC UM. Then, there is no need of RLC mode switch with the procedures such as RB release and RB setup. Instead of switching RLC mode, RRC may reconfigure transport channel type. By this way, the procedures of handover from non-HSPA cell to HSPA cell can be shortened. This also allows a seamless switching between DCH and HSPA, since the same time reference is used.

By including CFN or CFN-related information in the MAC TM header mapped on HSPA (MAC-hs, MAC-ehs or E-DCH), CS U-plane data ciphering/deciphering for RLC TM may be done at MAC entity. This also may remove any possible problem of de-synchronization of ciphering that had previously been identified when using the RLC UM mode due to lost packets, or especially non-detected errors.

Figure 5:
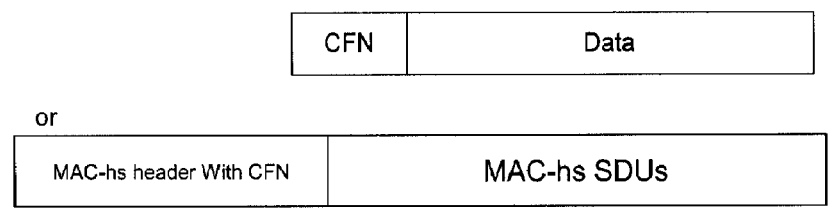
FIG. 5 is an exemplary view showing a data block generated in Medium Access Control (MAC) entity.

FIG. 5 is an exemplary view showing a data block generated in Medium Access Control (MAC) entity. More specifically, it shows PDU generated in the MAC-d. The MAC-d PDU may consist of an MAC header and a MAC Service Data Unit (MAC SDU), and the MAC SDU may have a variable size. The size of the MAC SDU may depend on the size of the RLC PDU, which is defined during a setup procedure.

The CFN as shown in FIG. 5 may indicate a value of the CFN at which the MAC-d PDU is generated, and may be used in the de-jitter process in the receiving side. Here, the jitter refers to a phenomenon in which each of data blocks continuously generated at a uniform time interval does not arrive according to its originally generated time interval when being transferred to the receiving side. To solve this problem, the receiving side re-aligns the received data blocks, and then processes the data blocks having been re-aligned in a certain time interval one by one. In the present invention, it is proposed that in the de-jittering procedure the receiving side should re-align the received PDUs according to the CFN order based on timing information included in the received PDU (i.e., CFN information), and then process the PDU or the SDU included in the PDU at a certain time interval based on the CFN value. Here, a de-jitter buffer may be used for the de-jittering process. In the above process, only a portion except the CFN may be ciphered or de-ciphered. During the process, however, inclusion of the CFN in all the MAC data blocks may be a waste. For instance, voice data is generated in every 20 ms, if the CFN is 12 bits, it would cover a time corresponding to 81 seconds. Such long CFN causes a waste of radio interfaces, and therefore, in the above process, the present invention may include bits only at a lower portion of the CFN in the MAC data block.

The present invention also supports subflow according to the characteristic of AMR codec. The 3GPP uses a codec named 'AMR' for the CS voice service. In the AMR codec, a data rate of a codec to be used variably changes depending on radio circumstances. In particular, three data subflows of A, B and C are generated in the AMR codec. Since data sizes generated in each subflow at each time vary, the transmitting side should effectively inform the receiving side about data amount being generated in each subflow.

Accordingly, the present invention proposes to include an indicator named 'Subflow Combination Index' within the generated PDU. This is a preset value by a terminal and a base station, and serves to indicate the number of each bit of the A, B and C subflows within a currently generated PDU. For instance, the subflow combination index as shown in FIG. 6 may be applied to the present invention. That is, each time the PDU is generated, the transmitting side checks data amount from each subflow included in each PDU, searches an index appropriate for the combination of the data amount, and then transmits the PDU by including the index therein. The receiving side checks the subflow combination index included in the received PDU, and according to the indication of the index, abstracts bits as many as the number corresponding to each subflow from the PDU, and thereby to deliver to each of the subflows.

As another method, according to the combination of the number of bits per subflow, which is currently being defined and allowed in the AMR, there is no index in which total sum of data corresponding to each subflow in each combination is the same. Therefore, if the index and the size of the received PDU are used, a corresponding index and data amount corresponding to each subflow in the PDU may be known. Accordingly, the present invention proposes that the receiving side should abstract bits of a pre-designated number from the PDU according to the size of the received PDU, and transfer the abstracted bits to each of the subflows. In this case, the DPCP PDU would include data only, not the header. FIG. 7 is an exemplary view showing a PDU format in case of multiplexing of subflows according to the present invention. Here, the multiplexing of the subflows is done by the PDCP entity.

FIG. 8 is an exemplary view showing a structure of Packet Data Convergence Protocol (PDCP) sub-layer for a CS domain according to the present invention. If the PDCP in FIG. 8 is used to transport the CS voice, the PDCP is mapped to 3 TM bearers in each direction. FIG. 8 shows that the multiplexing of each subflow is done by the PDCP entity. Here, the multiplexing is used when the CS service is accessed to the PS-based radio technology, such as the HSDPA or HSUPA, via the PDCP entity.

Every CS domain RAB is associated with one PDCP entity. The PDCP entity is associated with a number of RLC entities with Transparent Male corresponding to the number of subflows of the RAB. The PDCP entity serving the CS service does not use the header compression.

The present invention may have an effect of efficiently supporting CS service in the HSPA network by providing the operation method of transmitting, by the transmitting side, the Connection Frame Number included in the data block such that the receiving side processes each of received data blocks by the reference time, in providing Circuit Switched (CS) service using High Speed Downlink Packet Access (HSDPA) or High Speed Uplink Packet Access (HSUPA) technology.

The present invention may provide a method for providing data in wireless communication system, the method comprising: receiving at least one of service data units (SDUs) from an upper layer; adding a header to the at least one of received service data units (SDU) to generate a protocol data unit (PDU), wherein the header include timing information; delivering the generated protocol data unit to a lower layer, wherein the timing information is connection frame number (CFN), the timing information is added to a header in a packet data convergence protocol (PDCP) layer, the timing information is added to a header in a medium access control (MAC) layer, the timing information is a circuit switched (CS) counter, the timing information is related to connection frame number (CFN), the data is provided in packet service (PS) or circuit service (CS), and the upper layer is a RLC (radio link control) entity and a lower layer is a physical entity.

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention is not intended to limit the scope of the present invention to a certain type of wireless communication system. The present invention is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method for providing data in wireless communication system that supports High Speed Packet Access (HSPA), the method comprising:

receiving at least one service data unit (SDU) from an upper layer;

adding a header, in a packet data convergence protocol (PDCP) layer, to the at least one received service data unit (SDU) to generate a protocol data unit (PDU), wherein the header includes timing information; and delivering the generated protocol data unit to a lower layer, wherein the timing information is used for a de-jittering queue on a receiver side, wherein the timing information is a value of a counter, wherein the value of the counter is set by a portion of a connection frame number (CFN) included in the header of the generated PDU, wherein the portion of the CFN is first to fifth List Significant Bits (LSBs) of the CFN, and wherein the data is circuit switched (CS) service data provided in a packet switched (PS) network.

2. The method of claim 1, wherein the counter is a circuit switched (CS) counter.

3. The method of claim 1, wherein the lower layer is a Radio Link Control (RLC) layer.

4. A device of a wireless communication system that supports High Speed Packet Access (HSPA), the device comprising:

a memory; and a processor configured to:

receive at least one service data unit (SDU) from an upper layer;

add a header, in a packet data convergence protocol (PDCP) layer, to the at least one received service data unit (SDU) to generate a protocol data unit (PDU), wherein the header includes timing information; and deliver the generated protocol data unit to a lower layer, wherein the timing information is used for a de-jittering queue on a receiver side, wherein the timing information is a value of a counter, wherein the value of the counter is set by a portion of a connection frame number (CFN) included in the header of the generated PDU, wherein the portion of the CFN is first to fifth List Significant Bits (LSBs) of the CFN, and wherein the data is circuit switched (CS) service data provided in a packet switched (PS) network.

* * * * *